United States Patent
Wu et al.

(10) Patent No.: US 9,235,701 B2
(45) Date of Patent: Jan. 12, 2016

(54) LIGHT-OPERATED ELECTRONIC EQUIPMENT AND MOBILE ELECTRONIC DEVICE FOR CONTROLLING ELECTRONIC EQUIPMENT WITH LIGHT

(71) Applicant: Ching-Fang Wu, New Taipei (TW)

(72) Inventors: Ching-Fang Wu, New Taipei (TW); Chen-Han Chao, New Taipei (TW)

(73) Assignee: MICROAKITAS TECHNOLOGY CORPORATION, Apia (WS)

( * ) Notice: Subject to any disclaimer, the term of this patent is extended or adjusted under 35 U.S.C. 154(b) by 196 days.

(21) Appl. No.: 14/056,842

(22) Filed: Oct. 17, 2013

(65) Prior Publication Data
US 2014/0113592 A1    Apr. 24, 2014

(30) Foreign Application Priority Data

Oct. 18, 2012    (TW) .............................. 101138513 A

(51) Int. Cl.
  H04M 1/66    (2006.01)
  G06F 21/44    (2013.01)
  G06F 21/35    (2013.01)
  H04L 12/64    (2006.01)

(52) U.S. Cl.
  CPC ................ G06F 21/44 (2013.01); G06F 21/35 (2013.01); H04L 12/6418 (2013.01)

(58) Field of Classification Search
  CPC ...... H04W 12/02; H04W 12/06; H04W 12/08; H04W 12/12; H04B 10/11; H04B 10/1149
  USPC ........... 455/410, 411; 398/118, 128, 129, 130
  See application file for complete search history.

(56) References Cited

U.S. PATENT DOCUMENTS

| 6,161,005 A * | 12/2000 | Pinzon ........................... 455/403 |
| 7,917,034 B2 * | 3/2011 | Yu et al. ......................... 398/115 |
| 2005/0010694 A1 * | 1/2005 | Ma et al. ........................ 709/250 |
| 2012/0042363 A1 * | 2/2012 | Moosavi et al. .................. 726/5 |

* cited by examiner

*Primary Examiner* — Temica M Beamer
(74) *Attorney, Agent, or Firm* — Chun-Ming Shih

(57) ABSTRACT

A light-operated electronic equipment and a mobile electronic device for controlling an electronic equipment with light are provided. The light-operated electronic equipment with a light sensing receiving unit and a control unit is controlled by the mobile electronic device with a light source, a light control code module and a light display process module. Besides, further provides a process method of performing system registration by a light control way. By the process method, an information process device receives the input of the light signal through a transmission equipment, such that the light sensing receiving unit of the transmission equipment converts the brightness change of the light signal into the electric control code for the control unit of the transmission equipment to receive the electric control code and transmit the electric control code to the information process device through a transmission interface.

11 Claims, 9 Drawing Sheets

LIGHT-OPERATED ELECTRONIC EQUIPMENT AND MOBILE ELECTRONIC DEVICE FOR CONTROLLING ELECTRONIC EQUIPMENT WITH LIGHT

CROSS-REFERENCE TO RELATED APPLICATIONS

This application claims the priority of Taiwan Patent Application No. 101138513 filed on Oct. 18, 2012, in the State Intellectual Property Office of the R.O.C., the disclosure of which is incorporated herein by reference.

BACKGROUND OF THE INVENTION

1. Field of the Invention

The invention relates a light operated technique, particularly to a process method for system login in light-operated manner, a light-operated electronic equipment and a mobile electronic device for controlling an electronic equipment with light that use light signal to control status and operation manner of electronic product.

2. Descriptions of the Related Art

As the advanced mobile communication technologies developed, mobile phone and wearable device are almost to have one, and because the development of electronic technology, mobile electronic device, mobile phones and wearable device are no longer just a device to provide communication between people, such as the current prevalence of smart phones and wearable device (ex. smart watch), its function is quite powerful, already have as laptops and cameras and other electronic products provided by function, therefore, by the majority of consumers.

In response to the popularity of smart phone, the market for software developers are also constantly developing various functional service phone application software. However, the existing smart device application software App is also multi-functional services are limited to the operation of the mobile terminal, such as query the traffic information, instant messaging or financial processing application software, etc., but has not yet appeared by mobile electronic device (ex. smart phone or wearable device) to control or interaction with their external electronic devices actuation.

Based on the above issues, how to use the mobile electronic device to control the portable electronic device for its external action or its external electronic devices to interactive control, thereby expanding mobile electronic device add-on application for the Belongs to the technical field of the professionals urgent need to solve the problem.

SUMMARY OF THE INVENTION

In view of shortages of the existing technologies mentioned above, one object of the invention is to provide a process method for system login in light control manner for an user to process login to a login system with identify identification with carried mobile phone easily without any enter through keyboard.

Another object of the invention is to provide a light-operated electronic equipment and a mobile electronic device for controlling an electronic device with light for an user to perform control to or interaction with data storage equipment such as electronic lock, encrypted USB drive, portable hard disk, appliance or etc. with carried mobile phone or wearable device.

A further object of the invention is to provide a process method for system login in light control manner, a light-operated electronic equipment and a mobile electronic device for controlling electronic equipment with light for an user to perform simple operation through carried mobile phone without complex control procedure to complete desired control action.

To realize the above purposes and other related purposes, the invention provides a process method for system login in light-operated manner, including at least the steps of: an information process device receiving an input of a light signal through a transmission equipment, wherein, said transmission equipment has a light sensing receiving unit and a control unit coupling with said light sensing receiving unit; a mobile electronic device outputting a light signal with brightness change through a light source thereof, wherein, said light signal is outputted according to a light control code stored in the local end of said mobile electronic device; and the light sensing receiving unit of said transmission equipment sensing the light signal outputted from said light source, and converting the light signal into an electronic control code according to the brightness change of said light signal, for said control unit to receive and transmit said electronic control code to said information process device through said transmission equipment, for said information process device to perform system login process according to said electronic control code.

The process method for system login in light-operated manner as above, wherein, the light source of said mobile electronic device provides at least one light output area, said application program actuates said at least one light output area to output light with brightness change according to said light signal, and the control unit of said transmission equipment acquires a level signal of said light with brightness change according to the electronic control code converted by said light sensing receiving unit, thereby system website information used by said information process device to link system, login account and password for identifying user ID before logging in the system, or input user private dedicated data in said linked system are acquired. Wherein, said private dedicated data includes ID number, card number of credit card, home address, telephone number or birthday, and the application of said mobile electronic device provides encryption mechanism for said private dedicated data, and said linked system performs decryption process for the encrypted private dedicated data received thereby.

Further, to achieve the above purpose, the invention further provides a light-operated electronic equipment, which performs operation according to a light signal output from an light source, said light-operated electronic equipment including: a light sensing receiving unit, which is used to sense the light signal outputted from said light source, and converts the light signal into an electronic control code according to brightness change of said light signal; a memory unit, which is used to store at least one operation code; and a control unit, which is used to couple with said light sensing receiving unit for receiving said electronic code, and perform operation according to said operation code as said electronic control code coincides with said operation code.

The light-operated electronic equipment as above, wherein, said light source is arranged in a mobile electronic device, and said memory unit further stores a setting code, as said mobile electronic device outputs another light signal through the light source thereof, then said light sensing receiving unit converts said another light signal into another electronic control code according to brightness change of said another light signal; said control unit updates content stored in said memory unit as said control unit distinguishes that said another electronic control code coincides with said setting code.

In addition, the above-mentioned that the light-operated electronic equipment is a data storage, and said data storage device is connected with an information process device through a transmission interface, the operation code stored by the memory unit in said data storage device is an allowance access operation code, for said control unit to allow said information process deice for access to memory block provided by said data storage device through said transmission interface as the control unit in said data storage device distinguishes that the electronic control code converted by the light sensing receiving unit thereof coincides with said allowance operation code stored in said memory unit.

Further, said the light-operated electronic equipment as described above, wherein, said light-operated electronic equipment is an appliance produce, and the operation code in the memory unit of said appliance product is a function control code, said light sensing receiving unit converts said light signal into a functional setting value according to the brightness change of said light signal, such that said control unit executes operation according to the functional setting value converted by said light sensing receiving unit as the control unit of said appliance product distinguishes that the electronic control code converted by the light sensing receiving unit thereof coincides with said function control code stored in said memory unit.

Furthermore, in order to achieve the above purpose, the invention further provides a mobile electronic device for controlling an electronic equipment with light, including at least: a light source; a light control code module, which is used to store a light control code; and a light display process module, which controls a light signal having brightness change outputted from said light source according to said light control code, to control said electronic equipment with said light signal.

In the invention, the mobile electronic device for controlling electronic equipment with light, wherein, said light control code module and said light display process module are application programs installed in said mobile electronic device.

In the invention, the mobile electronic device for controlling an electronic equipment with light, wherein, said light source provides at least one light output area, said light control code includes a control code used to control said electronic equipment to execute different operations, said light display process module generates light signals corresponding to the control codes executing the different operations separately, and each of said light signals are represented by level signals of different brightness changes separately, such that at least one light output area outputs brightness change with different light signals according to the control codes executing the different operations, for said electronic equipment to execute operation according to said brightness change.

In the invention, the mobile electronic device for controlling an electronic equipment with light, wherein, said light source provides at least two light output areas, and said electronic equipment has at least two light sensing receiving units, for receiving a first brightness change and a second brightness change outputted from said at least two light output areas, respectively, said light control code includes control codes used to control said electronic equipment to execute different operations, said light display process module generates light signals corresponding to control codes executing the different operations separately, and said light signals are each represented by a clock signal and a level signal with different brightness changes separately, for said electronic equipment to acquire the clock signal of said first brightness change according to one light sensing receiving unit of said at least two light sensing receiving units, and said electronic equipment acquires the level signal of said second brightness change according to the another light sensing receiving unit of said at least two light sensing receiving units, for said electronic equipment to execute operation according to said first brightness change and said second brightness change.

In the invention, the mobile electronic device for controlling an electronic equipment with light, wherein, an application program of said mobile electronic device provides a functional setting interface corresponding to appliance products of different functions, and said functional setting interface will generate and store light control codes corresponding to the result set by the user, and said appliance product has a light sensing receiving unit, a memory unit and a control unit, said memory unit stores operation code for said control unit to use to determine whether or not the light signal transmitted from said mobile electronic device is the operation code executing predetermined operation, further stores functional setting value set by functional setting interface transmitted from said mobile electronic device through light signal output method, such that the control unit of said appliance product acquires the functional setting value corresponding to said operation code to execute the predetermined function as the control unit distinguishes that the electronic control code converted by the light sensing receiving unit thereof coincides with the operation code stored in said memory unit.

In summary, with respect to the process method for system login in light control manner, the light-operated electronic equipment, and the mobile electronic device for controlling an electronic equipment with light of the invention, the mobile electronic device controls the electronic equipment to be controlled through the light signal sent from the light source thereof, and the electronic equipment compares the compliance of the received information series with the stored operation code such that the command represented by the operation code is executed once in compliance. Besides, the invention utilizes the delivered light signal to control the operation of electronic equipment or replace a series of personal private data, link website, or login account and password entered through keyboard originally, and thereby achieves quick control, simplifies user control procedure and reduces effectively hardware cost of controlled electronic equipment with respect to display panel or input functional keys. Especially for hardware element HMI (Human Machine Interface) composed of I/O (Input/Output) unit such as key knob or display indicator etc. in existing conventional appliance products, with the light-operated electronic equipment, and the mobile electronic device for controlling an electronic equipment with light, together with the technical development of existing mobile electronic communication technology (for example, smart phone), the application program (APP) on the above mobile electronic device may be utilized to provide appliance products of different functions with corresponding functional setting interfaces, that is, replacing above hardware element HMI with graphical HMI or touch icon (for example, virtual key) etc., so that the operation convenience may be improved effectively for users and the cost of such conventional appliance products with respect to part assembly may be reduced.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
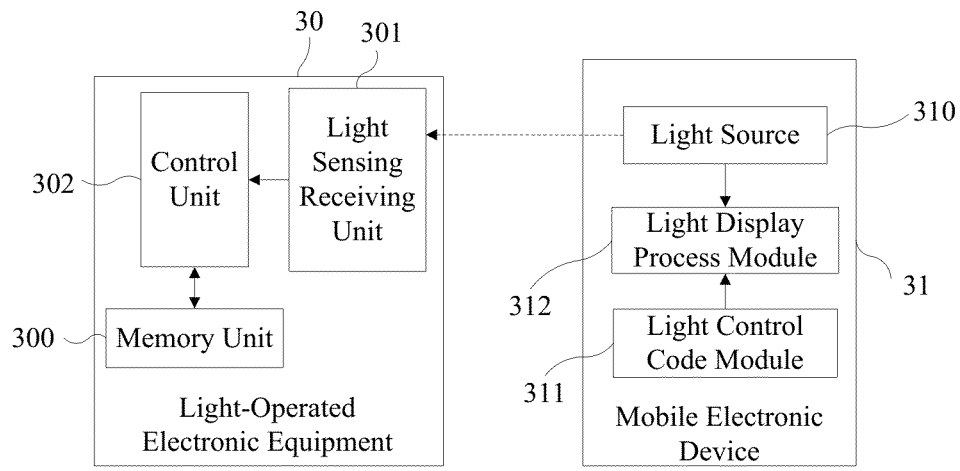
FIG. 1 is a block diagram for the basic structure of the light-operated electronic equipment and the mobile electronic device for controlling an electronic equipment with light according to the invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

With respect to the process method for system login in light control manner, the light-operated electronic equipment and the mobile electronic device for controlling an electronic equipment with light according to the invention, a light signal is mainly utilized as a transmission signal between equipments, and after an user performs simple input through a mobile electronic device with a light source such as smart phone, mobile phone, wearable device, recording pen, notebook or language translation machine etc., the mobile electronic device may output the light signal to the controlled light-operated electronic equipment such that the goals of quick control, simplification of user control procedure and effective cost down of hardware for controlled electronic equipment are achieved.

To explain clearly how the invention utilize the mobile electronic device to output the light signal to the controlled light-operated electronic equipment, the operation principle of the invention will be explained in detail with multiple examples below. However, before the explanation of the multiple examples, necessary components for both of the light-operated electronic equipment and the mobile electronic device for controlling an electronic equipment with light are explained at first. As shown in FIG. 1, it is the block diagram showing the basic structure of the light-operated electronic equipment and the mobile electronic device for controlling an electronic equipment with light according to the invention. The mobile electronic device for controlling electronic equipment 31 with light includes at least: a light source 310, a light control code module 311 and a light display process module 312; while the light-operated electronic equipment 30 includes at least: a memory unit 300, a light sensing receiving unit 301 and a control unit 302.

The light source 310 may be a light emitting diode (LED) display or a liquid crystal display (LCD), or any display device capable of outputting light with brightness change.

The light control code module 311 is used to store a light control code, which is used for the light source 310 to output the light signal indicative of brightness change. The light control code is, for example, an instruction code for the light-operated electronic equipment 30 to execute a specific action. Specifically, if the light-operated electronic equipment 30 is, for example, an electronic lock, the light control code may be an unlocking control code, by which the lockset of the electronic lock is controlled to be in unlocking status.

The light display process module 312 controls the light source 310 to output the light signal with brightness change according to the light control code stored in the light control code module 311. Also, light control codes with different control functions will be indicated by light signals with different brightness changes.

In one embodiment, the light control code module 311 and the light display process module 312 may perform the aforementioned process with an application program installed in the mobile electronic device 31. Specifically, the application program may provide an UI (User Interface) for an user to set control instructions or procedures of the light-operated electronic equipment to be controlled by the UI. After the user completes the setting, the application program (for example, the light control code module 311) generates and stores the light control codes corresponding to the control instructions or procedures set by the user, such that the application program (for example, the light display process module 312) extracts the corresponding light control codes from the light control code module 311 according to the entered instructions or procedures for the light source 310 to output light signals corresponding to the extracted light control codes when the user enters control instructions or procedures through the UI. At the same time, the mobile electronic device 31 of the user and the light-operated electronic device 30 have to be kept away within a predetermined distance for use. The predetermined distance is a distance within which the light sensing receiving unit 301 of the light-operated electronic equipment 30 is capable of sensing the light signals output from the light source 310. In other words, depending on work property of the light sensing receiving unit 301, for example, the light source 310 may need to close to the light sensing receiving unit 301, instead of zero distance, or the interval between the light source 310 and the light sensing receiving unit 301 may be 5 cm or 10 cm, that is, be kept away with a predetermined interval.

The light sensing receiving unit 301 is used to sense the light signal outputted from the light source 310 to convert the brightness change of the light signal into an electronic control code, that is, to convert the analog light signal into the digital electronic signal, for the control unit 302 to process.

The memory unit 300 is used to store at least one operation code for the control unit 302 to perform reading, thereby to realize control process of the light-operated electronic equipment 30. As delivery, the light-operated electronic equipment 30 may have a pre-stored preset operation code, which may be changed according to the user requirement.

The control unit 302 is coupled with the light sensing receiving unit 301 to receive the electronic control code. If the electronic control code is compared with the operation code stored in the memory unit 300 to result in compliance, the control unit 302 will execute operation according to the action represented by the operation code. As the previous example, if the light-operated electronic equipment 30 is, for example, an electronic lock, and the action represented by the operation code is to execute unlocking, then the control unit 302 of the electronic lock controls the lockset status setting to be an unlocking status. Moreover, specifically, the control unit 302 may be a micro process unit (MPU) or a micro controller unit (MCU). Therefore, depending on hardware specification of the micro process unit (MPU) or the micro controller unit (MCU), the above memory unit 300 may be built in the micro process unit (MPU) or the micro controller unit (MCU).

From above, with respect to interaction between the light-operated electronic equipment 30 and the mobile electronic device 31 according to the invention for the user, the control instruction for controlling the light-operated electronic equipment 30 has only to be pre-stored in the mobile electronic device 31 in advance, for the mobile electronic device 31 to generate the light signal corresponding to the control instruction for the light-operated electronic equipment 30, such that the light-operated electronic equipment 30 may execute corresponding action as long as the light-operated electronic equipment 30 may interpret the instruction represented by the light signal. An application example and the effect thereof in the invention will be explained specifically below with a basic structure illustrated in FIG. 1 stated above.

Figure 2:
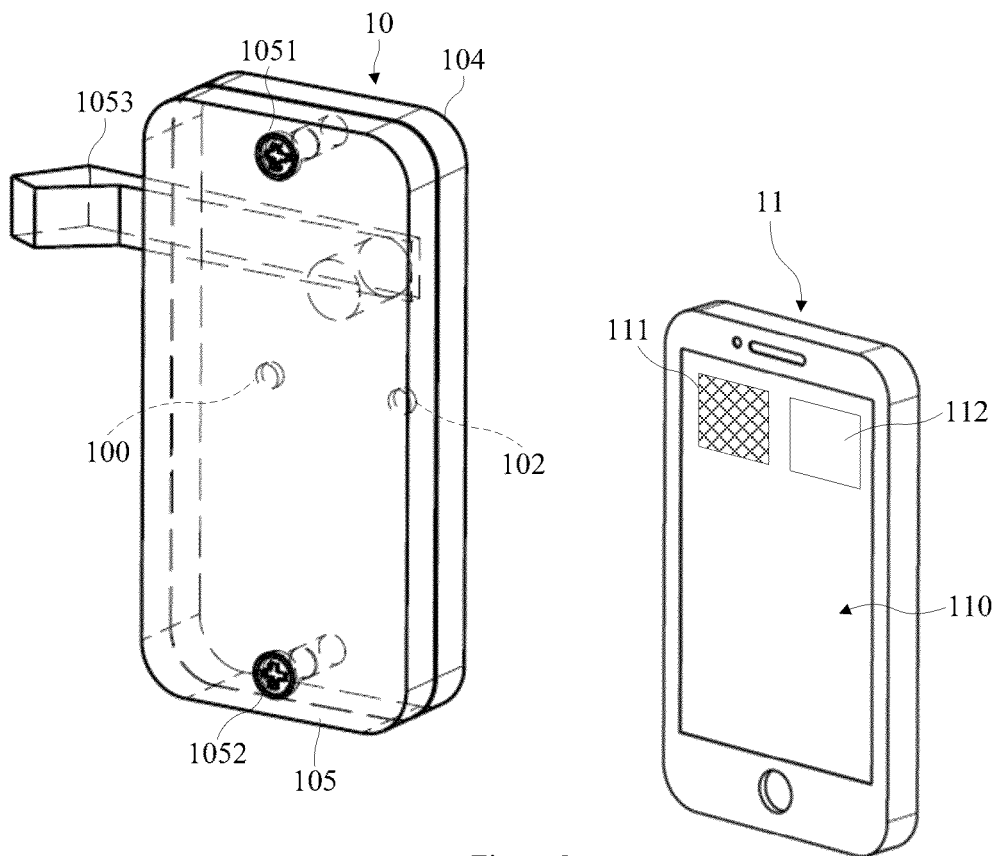
FIG. 2 shows the first example of the light-operated electronic equipment and the mobile electronic device for controlling an electronic equipment with light according to the invention.
Figure 3:
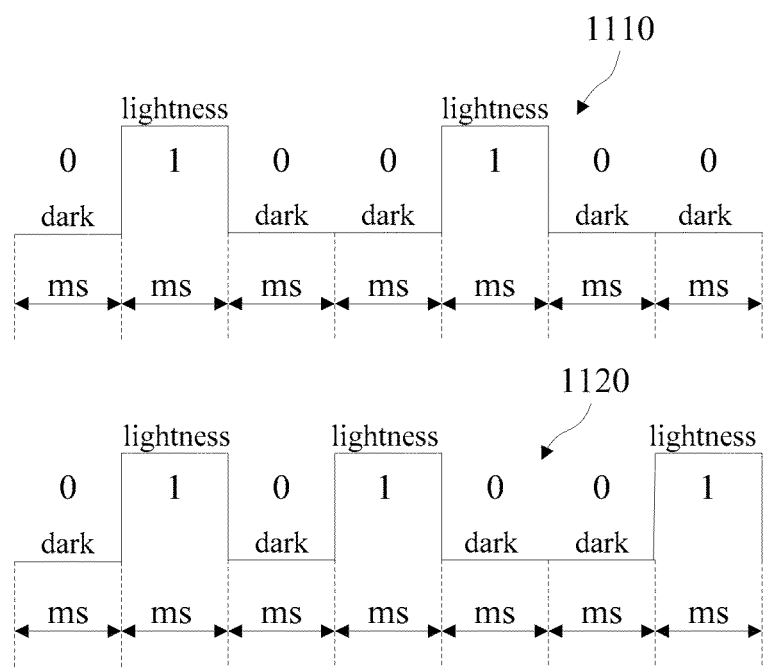
FIG. 3 is a timing diagram showing the brightness change of a light signal outputted from the light source of a smart phone and sensed by the light sensing receiving unit of the light-operated electronic equipment in FIG. 2.

As shown in FIG. 2, it is the first example of the light-operated electronic equipment and the mobile electronic device for controlling an electronic equipment with light. That is, the light-operated electronic equipment 30 is applied to an electronic lock 10 and the mobile electronic device 31 of the invention is applied to a smart phone 11 in the example. The electronic lock 10 in the example also includes a cover 104 and a seat 105, which may be fastened together with screw. The seat 105 is used to fasten the memory unit 300, the light sensing receiving unit 301 and the control unit 302 as illustrated in FIG. 1, while the cover 104 is used to cover the memory unit 300, the light sensing receiving unit 301 and the control unit 302 as mentioned previously, to provide protection function. Also, the seat 105 is secured through screws (1051, 1052) to an object with security need, for example, door. Besides, the electronic lock 10 may be also provided with the structure of conventional lockset, including, for example, members such as locking spring, lock cylinder and keyhole, handle 1053 etc., for the user to choose a conventional key or an electronic password for unlocking or locking works. To simply explanation and drawing, the unlocking or locking structure with the conventional key, the securing structure between the cover 104 and the seat 105 and the function thereof mentioned above will not be explained below, and only the parts related to the invention will be explained. Also, particularly, the housing structure of the electronic lock 10 applying the light-operated electronic equipment of the invention is not limited hereto, but is explained only as illustration. There are two light sensing receiving units (100, 102) exposed to the housing of the electronic lock 10. Correspondingly, the light source 110 of the smart phone 11 is provided with two light output areas (111, 112). The two light sensing receiving units (100, 102) are used to receive brightness changes of the light signals outputted from the two light output areas (111, 112), respectively. As shown in FIG. 3, it shows a timing diagram for the brightness change of the light signals outputted from the light source 110 of the smart phone 11 sensed by the light sensing receiving units (100, 102) of the electronic lock 10. The upper timing diagram in FIG. 3 shows the light signal 1110 output from the light output area 111, the lower timing diagram in FIG. 3 shows the light signal 1120 output from the light output area 112, and the above light signal 1110 has been converted by the light sensing receiving unit 100 into an electronic code, moreover, the above light signal 1120 has been converted by the light sensing receiving unit 102 into an electronic code, for the user to complete unlocking, locking or changing setting for the electronic lock 10 quickly. Therefore, in the example illustrated in FIG. 2, the smart phone 11 outputs two sets of light signals synchronously as one light control code output, and the smart phone 11 allows the light source 110 to perform light signal output with different brightness changes according to different operations of unlocking, locking or changing settings. From FIG. 3, a level signal (for example, converted electronic control code) with brightness change indicates the unlocking control code, locking control code or setting control code output from the smart phone 11. After that, the control unit of the electronic lock 10 compares the unlocking control code, locking control code or setting control code sensed by the light sensing receiving unit (100, 102) with the unlocking operation code, locking operation code or setting operation code stored in the memory unit, such that the unlocking, locking or changing setting operation the user desires to execute is implemented under compliance situation after comparison.

Additionally, for light control codes such as unlocking control code, locking control code and setting control code etc. stored in the light control code module of the smart phone 11, the unlocking control code is used to control the lockset of the electronic lock 10 to be in an unlocking status, the locking control code is used to control the lockset of the electronic lock 10 to be in a locking status, and the setting control code is a program instruction or a determination password for allowing to execute aforementioned setting or update used to set or update setting content stored in the electronic lock 10. With the output of the setting control code, for example, the setting of system time and multiple sets of unlocking control passwords may be executed for the electronic lock 10 to be controlled. More particularly, the multiple sets of unlocking control password may be further specified as one-time passwords effective on the current day or within specific days. The content about how to control the lockset status of the electronic lock 10 and how to update the electronic lockset 10 through the smart phone 11 will be discussed in detail later. Besides, it is noted that the above light control code may not include the above locking control code. For example, if the controlled electronic lock 10 is used as security object of a door, as the door is closed (that is, generally so-called closing action, for example, closing a door of a room in a restaurant), the electronic lock 10 is in locking status. Therefore, the electronic lock 10 of the light-operated electronic equipment in the invention may be used to design the control code content to be stored in or transmitted from the smart phone according to the unlocking, unlocking or changing function provided thereby, but the invention is not limited to this example.

For the user to update unlocking code or locking code of the electronic lock 10 conveniently in consideration of security without the unlocking code or the locking code to be modified by others, a setting operation code may be further stored in the memory unit of the electronic lock 10. Specifically, as for the setting condition of the unlocking code or the locking code, and after the light sensing receiving unit 301 senses the light signal outputted from the smart phone 11 through the light source 110 thereof and converts to the corresponding electronic control code, the unlocking operation code or the locking operation code stored in the memory unit may be allowed to be updated, or even the setting operation code or the system information, for example, setting content such as system time etc., of the electronic lock 10 may be allowed to be updated as the lockset status of the electronic lock 10 is in unlocking status. Moreover, the aforementioned condition for changing setting may be not necessary as the lockset status is unlocking status. For example, as the lockset status is in locking status, the setting operator may also utilize the smart phone 11 to output the light signal through the light source thereof to perform change setting for the setting content stored in the memory unit. In such case, the housing of the smart phone 11 has to be provided with a light sensing receiving unit toward the interior of the door. Further, because the setting operation code in the memory unit may be regarded as one determination password allowing to execute the aforementioned changing setting content, no matter whether or not the electronic lock 10 is in unlocking status, or the electronic lock 10 is in locking status and the smart phone 11 is out of the door, the setting content stored in the memory unit may be allowed to be updated (including changing or setting) only if electronic control code is compared with the setting operation code stored in the memory unit to be compliant by the control unit. The setting content is, for example, system time, one or more sets of unlocking codes, and may particularly specify that the unlocking code is one-time password effective on the current day or within specific days.

In addition, besides the correspondence of two light output areas (111, 112) to two light sensing receiving units (100, 102) shown in FIGS. 2 and 3 above, the correspondence of single light output area to single light sensing receiving unit may also be adopted. Also the light display process module of the smart phone 11 generates a set of light signals corresponding to the unlocking control code, the locking control code and the setting control code, respectively. Moreover, the light signals are represented by level signals of different brightness changes under different operations, wherein the level signal is an information serial signal used to represent unlocking, locking or changing setting.

Figure 4:
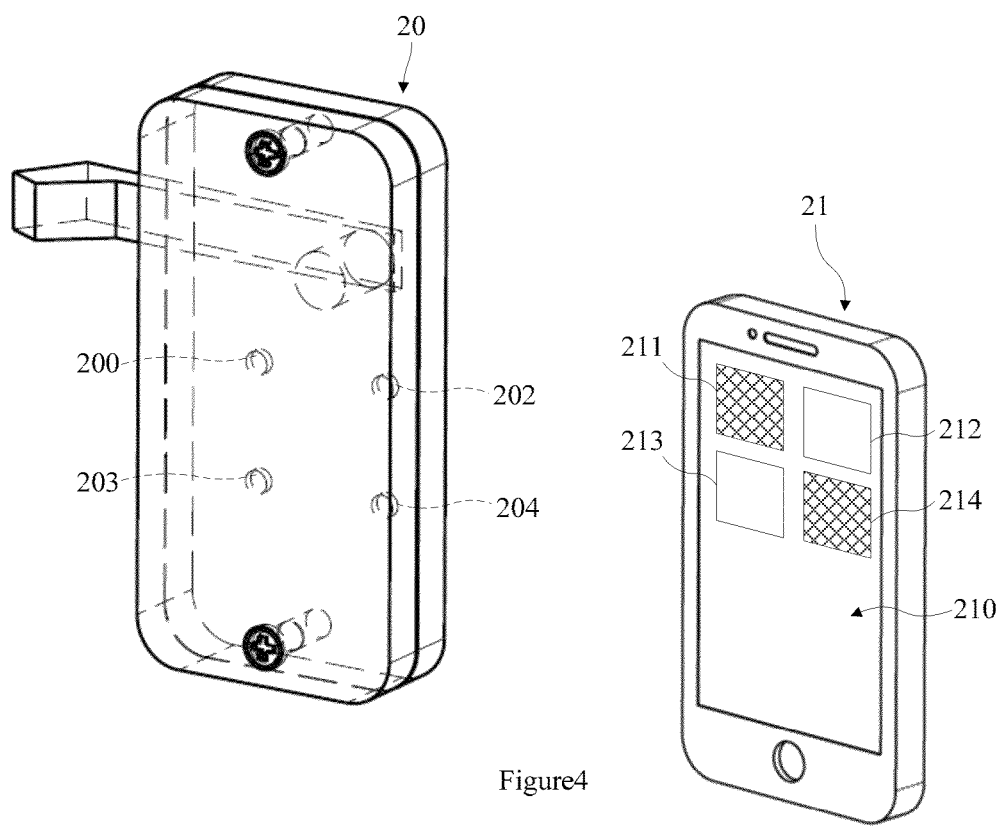
FIG. 4 is an alternative example of the light-operated electronic equipment and the mobile electronic device for controlling an electronic equipment with light in FIG. 2.
Figure 5:
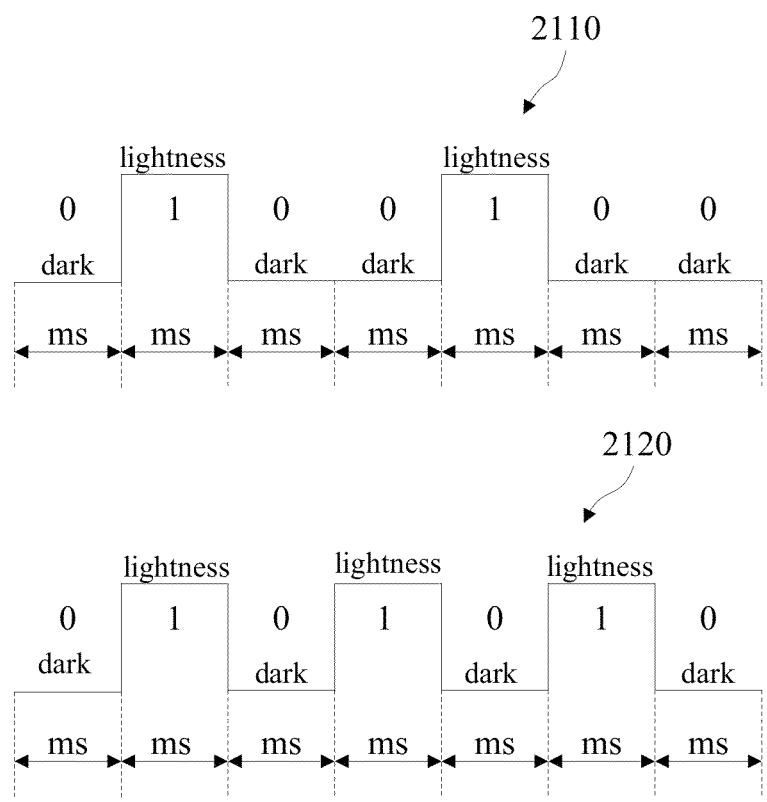
FIG. 5 shows a timing diagram for the brightness change of a light signal outputted from the light source of a smart phone and sensed by a set of light sensing receiving units of the light-operated electronic equipment in FIG. 4.
Figure 6:
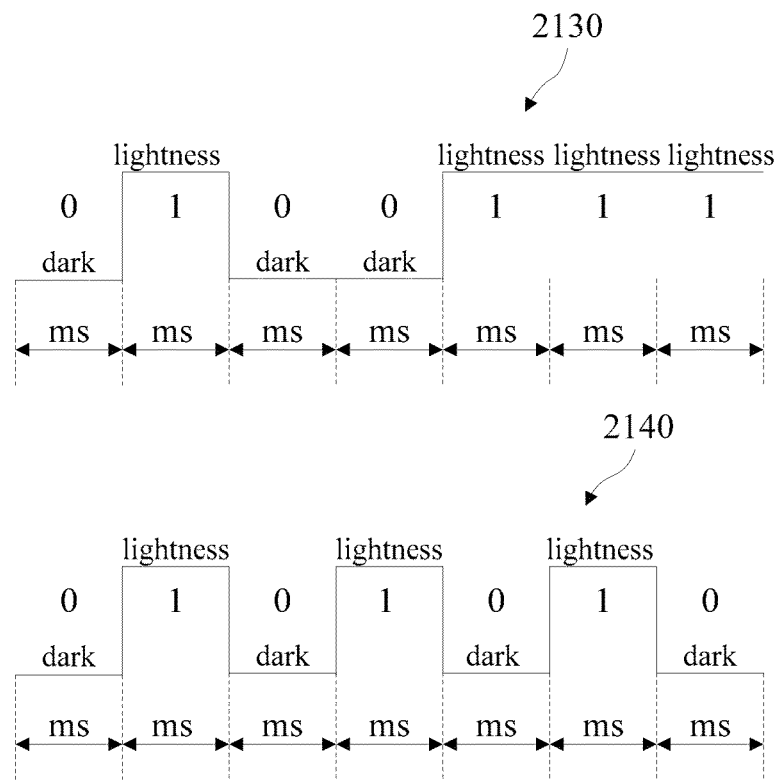
FIG. 6 shows a timing diagram for the brightness change of a light signal outputted from the light source of a smart phone and sensed by another set of light sensing receiving units of the light-operated electronic equipment in FIG. 4.

Subsequently, as shown in FIG. 4, it is another variant example used to explain FIG. 2. In this example, the example of the mobile electronic device is still the smart phone 21, while that of the light-operated electronic equipment is still the electronic lock 20. There are four light sensing receiving units (200, 202, 203, 204) exposed to the housing of the electronic lock 20. Correspondingly, the light source 210 of the smart phone 21 provides four light output areas (211, 212, 213, 214). The four light sensing receiving units (200, 202, 203, 204) are used to receive the brightness changes of the light signals output from the four light output areas (211, 212, 213, 214). As shown in FIGS. 5 and 6, they are timing diagrams showing the brightness changes of the light signals output from the light source 210 of the smart phone 21 sensed by the light sensing receiving units (200, 202, 203, 204) of the electronic lock 20. The upper timing diagram in FIG. 5 is the light signal 2110 output from the light output area 211. The lower timing diagram in FIG. 5 is the light signal 2120 output from the light output area 212. The upper timing diagram in FIG. 6 is the light signal 2130 output from the light output area 213. The lower timing diagram in FIG. 6 is the light signal 2140 output from the light output area 214. In comparison of this example and the example shown in FIG. 2 above, because the light source 210 of the smart phone 21 provides four light output areas (211, 212, 213, 214) with the output light signals (2110, 2120, 2130 and 2140) synchronized, respectively, the user is allowed to complete unlocking, locking or changing setting operation for the electronic lock 10 quickly.

Besides, because the example in FIG. 4 provides more light output areas, the light source 210 of the smart phone 21 output synchronously four light display areas (211, 212, 213, 214). For the light sensing receiving units (200, 202, 203, 204) of the electronic lock 20 to receive each of the light signals (2110, 2120, 2130, 2140) for the control unit to perform comparison process to compare the control instructions represented by the light signals to control the lockset, in the example, shown in FIG. 4, two light output areas are one set of light process sources, the light signal output from one light output area in the set of light process sources indicates the password data of locking, unlocking or changing setting, while the light signal output from another light output area in the set of light process sources indicates clock signal. More specifically, as shown in FIGS. 5 and 6, if the password data of the locking, unlocking or changing setting set by the user is very long, to shorten the output time of the light signal and the computation time for the control unit of the electronic lock 20, the aforementioned password data may be divided into several segments. As for the example shown in FIG. 4, the division into two segments is taken as an example, therefore, there are two sets of light process sources, among which one set of light process sources include light output area 211 and light output area 212, while the other set of light process sources include light output area 213 and light output area 214. Further, the light signal 2110 shown in the upper part of FIG. 5 is an electronic code output from the light output area 211 and converted by the light sensing receiving unit 200 to indicate a portion of password data for the execution of locking, unlocking or changing setting, while the light signal 2120 shown in the lower part of FIG. 5 is an electronic code output from the light output area 212 and converted by the light sensing receiving unit 202 to indicate the output clock of the aforementioned light signal 2110. Moreover, the light signal 2130 shown in the upper part of FIG. 6 is an electronic code output from the light output area 213 and converted by the light sensing receiving unit 203 to indicate another portion of the password data used for the execution of locking, unlocking or changing setting, while the light signal 2140 shown in the lower part of FIG. 6 is an electronic code output from the light output area 214 and converted by the light sensing receiving unit 204 to indicate the output clock of the aforementioned light signal 2130. Therefore, the electronic lock 20 combines or identifies the divided and transmitted password data or control instruction with the electronic control code received to indicate the password data and the electronic control code received to indicate the output clock, and performs comparison with the operation code (for example, locking operation code, unlocking operation code or setting operation code etc.) stored in the memory unit to execute the control to be performed by the user.

In detail, the light signal 2120 and the light signal 2140 shown in the lower parts of FIGS. 5 and 6 indicate clock signal. Because as the smart phone 21 and the electronic lock 20 are in communication, their clocks have to be compliant for correct data in transmission, with the light signal 2120 and the light signal 2140 used for synchronization as the smart phone 12 and the electronic 20 are under transmissions, both of the smart phone 21 and the electronic lock 20 have timers and use clock lines for clock signal transmission. In the example, brightness changes of light signals are used to indicate clock signals. Also, from FIGS. 5 and 6, the smart phone 21 in the example transmits the clock signal and information serial signal indicative unlocking, locking or changing setting to the electronic lock 20 together. Additionally, the level signal of brightness change stated in the example does not limited to indicate level signal 1 as lightness and level signal 0 as dark, but even presents lightness or dark of light signal with combinations of several different level signals. In other words, the level signal of brightness change of light signal does not limit to what shown in FIGS. 3, 5 and 6 above.

In addition, In examples FIGS. 2 and 4, the presentation style of the electronic control code converted from the light signal output from the light display area sensed by the light sensing receiving unit is not limited to the combination or identification executed for the light signal shown in FIGS. 3, 5 and 6 above, but there are more digital signal process methods. For example, as the lockset of the electronic lock is in unlocking status, when the light sensing receiving unit senses the light signal sent by the mobile electronic device and converts an information series (level signals as shown in FIGS. 3, 5, and 6), the control unit may regard the first few head bits in the information series a the action to be executed by the electronic lock. Subsequently, the control unit starts to execute the action according to the middle bits in the information series. As the execution of the action is complete, the "check code" form attached at the tail in the information series is relied to identify the transmission content of the light signal and the execution result of the action for the user of the smart phone 21. For example, as an output device such as LED lighting element or speaker etc. is provided on the housing of the electronic lock, the user be fed back in flashing form or audio form for the user to recognize the "success" or "fail" of the action executed by the electronic lock.

In other words, the control unit of the electronic lock converts the light signal output from the light display area sensed by the light sensing receiving unit, or the light display process module of the smart phone controls the light source to output the light signal with brightness change according to pre-stored light control code. There are information series with different formats and contents according to the digital signal encoding or interpretation method provided by the electronic lock and the smart phone.

Further, from the examples illustrated in FIGS. 2 and 4, the light control code processed by the light display process module of the mobile electronic device may be provided for other mobile electronic devices to use for other users to perform operations of the same function for the electronic lock. However, at the same time as convenient share is achieved together with the balance of security, the light display process module further provides one-time password (that is, one-time light control code) for other mobile electronic devices to use. Besides the original password used to control the electronic lock, the one-time password is further attached with a predetermined code, which is used for the controlled electronic lock to recognize that the one-time password is authorized and allowed to be used. Therefore, when the one-time password as a light signal is output to the light sensing receiving unit of the electronic lock for sensing and conversion to acquire an information series, after the control unit of the electronic lock interprets the informational series, the informational series is recognized as a one-time password and the action (actions such as unlocking or locking etc.) to be executed available with the one-time password is recognized.

Besides, in another example illustrated in FIGS. 2 and 4 above, as the mobile electronic device transmits informational series such as unlocking, locking or changing setting etc. in light signal to the electronic lock, for protecting the transmission security of informational series, the light display process module of the mobile electronic device may perform password encoding with a predetermined password coding format, for example, fixed coding format or Rolling Code, for the informational series desired to be delivered in light signal. In correspondence to different password encoding method, therefore, corresponding decoding module has also to be configured in the control unit on the electronic lock side, such that as the light sensing receiving unit senses and converts the light signal delivered by the mobile electronic device into an information series with password encoding, the decoding module of the control unit in the electronic lock may decode the information series with password encoding. Therefore, the essential content of the informational series with password encoding may be interpreted. Subsequently, the control unit starts an action such as unlocking, locking or changing setting etc. depending on the middle bit values in the essential content of the informational series. If the user has higher level security consideration, the light display process module of the mobile electronic device may utilize Rolling Code to perform password encoding for the information series to be delivered. So that even though the light signal is sidelong glanced or copied without permission by unauthorized people, only the decoding module on the corresponding electronic lock side is allowed to perform Rolling decoding such that considerable high security is achieved.

Besides, in a further example illustrated in FIGS. 2 and 4, a proximity sensor may be provided on the end side of the housing of the mobile electronic device. The proximity sensor is utilized to sense whether or not the mobile electronic device has approximated to the electronic lock for, as proximity is identified, the light display process module of the mobile electronic device to deliver the informational series used to execute the action such as unlocking, locking or changing setting etc. with the light signal.

Moreover, besides the use of light output method for the electronic lock to receive the informational serial signal used to indicate unlocking, locking or changing setting or the clock signal for transmission synchronization transmitted by the mobile electronic device, in another variant example illustrated in FIGS. 2 and 4, earphone holes may be further provided on the electronic lock and the mobile electronic device, such that signals may be transmitted mutually with the earphone holes on both sides and one dual-head earphone line to transmit I/O control signals with FSK (Frequency Shift Keying) digital transmission method. Because FSK technology belongs to existing communication protocol and earphone signal process method is also current technology, to simplify explanation, the principles and functions will not be explained additionally herein.

Generally speaking, a mobile electronic device, for example, mobile phone, notebook or language translating machine etc., is provided with an earphone hole, and the electronic lock may also be provided with an earphone hole on the seat (such as seat 105 illustrated in FIG. 2) thereon.

Because the seat is a box body in contact with the door, and the seat may only be contacted on the inner side of the door (that is, toward to the space in a house) by the user usually after unlocking, the data stored in the electronic lock may be prevented from being read or modified arbitrarily by unauthorized people. There are two types of signal flow process methods once the user connect the electronic lock and the mobile electronic device through a dual-head earphone line, one signal flow is output from the electronic lock to the mobile electronic device, for example, the user may read data such as passwords of each group or firmware version information stored in the electronic lock through the mobile electronic device; while the other signal flow burns data such as light control code stored in the mobile electronic device into the electronic lock, or updates the firmware of the electronic lock by the mobile electronic device etc. In addition, because the electronic lock and the mobile electronic device may be connected through the dual-head earphone line, whenever the setting content stored in the electronic lock is to be changed by the mobile electronic device, the mobile electronic device may deliver an instruction to the electronic lock for the control unit of the electronic lock to change the setting content stored in the electronic lock according to the instruction. In such case, the setting operation code in the memory unit of the electronic lock is a program instruction, and the program instruction is a command used for the execution of changing setting content. Thus, the control unit compares the instruction delivered by the mobile electronic device with the setting operation code stored in the memory unit, such that the electronic lock may change the original setting content according to the data transmitted from the mobile electronic device if the instruction delivered by the mobile electronic device is recognized as a command for the execution of changing setting content. From above, the electronic lock and the mobile electronic device (for example, smart phone) illustrated in FIGS. 2 and 4 are connected with each other through earphone holes on both sides and one dual-head earphone line for the user to update or read the data of the electronic lock conveniently and quickly.

Also, To improve the operation convenience of the electronic lock illustrated in FIGS. 2 and 4, the electronic lock may be further provided with voice recognition function, and the light display process module of the mobile electronic device is further provided with pronunciation certification function, so that the user may choose voice signal output method for the mobile electronic device to perform unlocking control.

From the application example illustrated in FIGS. 2 and 4, the electronic lock of the light-operated electronic equipment of the invention is applied together with the light signal of brightness change output from the mobile electronic device of the invention to control the lockset of the electronic lock from locking status to unlocking status, and the light signal may be used to represent the unlocking password of the electronic lock to replace the function of a conventional key such that the inconvenience of carrying the conventional key may be omitted. More particularly, because the light signal is stored in the local end of mobile electronic device or other ends in digital form, for example, cloud equipment, the light signal stored in digital form may be sent to the user with unlocking need by network communication method such as E-mail, communication software etc., or wireless connection method or wired connection method such as infrared, Bluetooth or wireless RF etc. Besides of the operation inconvenience that the user has to key in a series of passwords one by one, the absolute dedication right problem of convention key is also figured out effectively.

Figure 7:
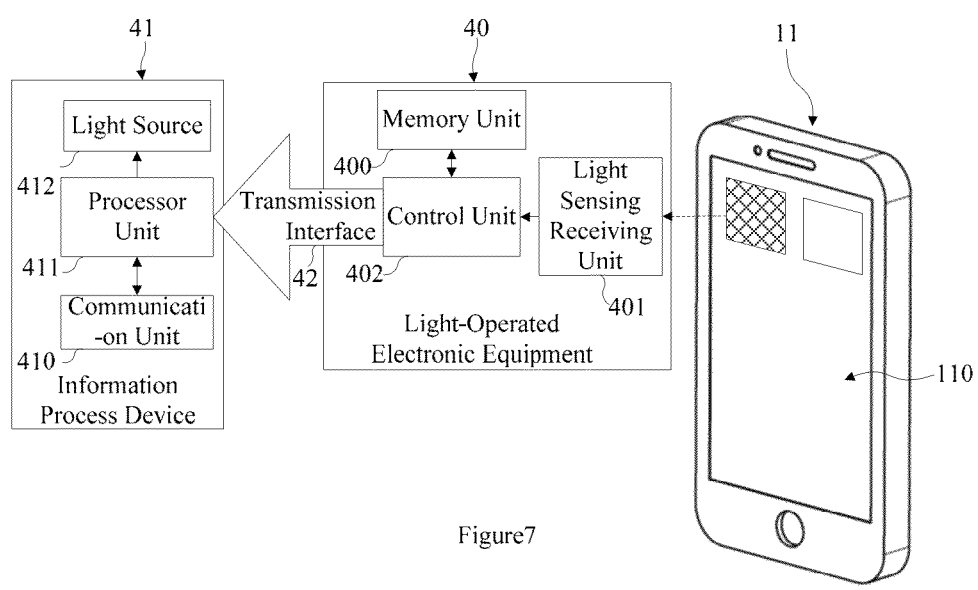
FIG. 7 is the second example of the light-operated electronic equipment according to the invention.

As shown in FIG. 7, it illustrates the second example of the light-operated electronic equipment in the invention. In this example, the light-operated equipment 40 is applied to, for example, a data storage device such as external hard drive or USB drive etc. The light-operated electronic equipment 40 is connected with an information process device 41 through a transmission interface 42. The information process device 41 is, for example, notebook or desktop computer etc., and the transmission interface 42 is, for example, USB (Universal Serial Bus). Also, both of the information process device 41 and the light-operated electronic equipment 40 support USB transmission protocol for both sides to transmit data mutually. More specifically, the connection between the light-operated electronic equipment 40 and the information process device 41 is like the insertion of an USB drive to a computer. Because USB transmission protocol is existing technology, and the communication unit 410, the processor unit 411 and the light source 412 etc. in the information process device 41 are members necessary in the existing computer equipment, to simplify explanation, there will be no further description, but only members related to the invention will be explained in detail.

The difference of the light-operated electronic equipment 40 in this example compared to an existing USB drive is that, as illustrated in FIGS. 2 and 4, the light-operated electronic equipment 40 is further provided with a light sensing receiving unit 401, which is used to sense the light signal output from, for example, the mobile electronic device of the smart phone 11. Moreover, in this example, the light signal output from the light source 110 of the smart phone 11 represents a set of access passwords, which are used to determine whether or not the information process device 41 may read the memory unit 400 of the light-operated electronic equipment 40.

Specifically, because the light-operated electronic equipment 40 is a data storage device, it must have a memory unit 400. Moreover, in this example, the memory unit 400 further stores a set of allowance access operation codes. As the control unit 402 receives the electronic control code converted by the light sensing receiving unit 401 and compares to result in compliance of the electronic control code and the allowance access operation code stored in the memory unit 400, the control unit 402 allows the information process device 41 to access the memory unit 400 through the transmission interface 42. Additionally, the information process device 41 does not only access the data in the memory unit 400 through the transmission interface 42. For example, the magnetic disk provided by the USB drive may be generally partitioned into public area and security area. Therefore, the memory unit 400 used to store the allowance access operation code may be the security area to prevent the allowance access operation code from being modified arbitrarily by people. In fact, as the electronic control code and the allowance access operation code stored in the memory unit 400 are compared to be compliant by the control unit 402, the control unit 402 allows the information process device 41 to access the aforementioned public area (not shown in figures) through the transmission interface 42. In other words, the access setting depends on the property of the memory block provide by the light-operated electronic equipment 40, but not limited to this example. From above, the data in the data storage device may be prevented from being read arbitrarily by others with the data security of the data storage device provided by the light-operated electronic equipment 40 of the invention.

Figure 8:
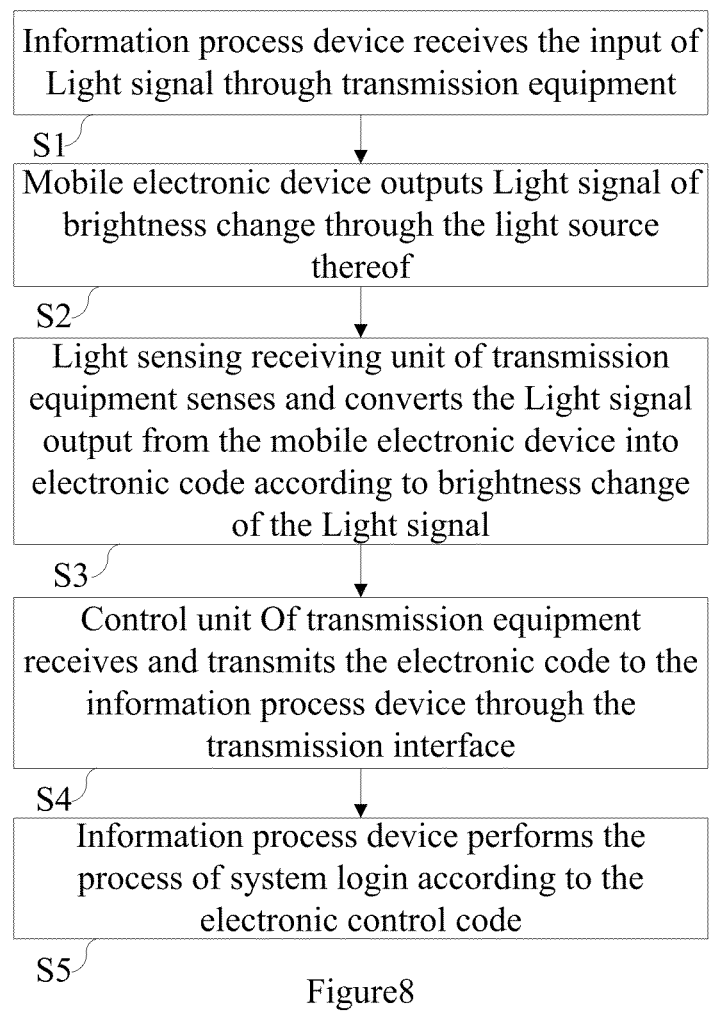
FIG. 8 is a flow chart showing a procedure of the process method for system login in light control manner achieved by the mobile electronic device for controlling an electronic equipment with light according to the invention.

Next, refer to FIG. 8, which illustrates a procedure flow chart of a process method for system login in a light control method achieved by utilizing a mobile electronic device of light-operated electronic equipment in the invention. It is noted that, the aforementioned system login includes: for example, the information process device 41 illustrated in FIG. 7 connects with internet (not shown) through the communication unit 410 to log in to a certain network service system, such as network bank system, mail server system or shopping website etc., and an user may be allowed to enter login account and password for user identification before login ti the network service system; besides, it may also be an input process of entering a system website information of a certain network service system before the user desires to log in to a certain network service system by using the information process device 41 to connect with the internet through the communication unit 410; or for example, an input process of entering the opening account and password by the user before the program system is started or before the encrypted file is opened as the local end of the information process device 41 executes the specific program system or opens the specific encrypted file; even further, private dedicated data of the user entered in the network service system, for example, ID, card number of credit card, home address, telephone number or birthday etc. Briefly speaking, that is, as for information process device, the process of executing system login, system connection or system waiting for user's input of specific data through network system (for example, internet or local area network etc.) is not done by the user to control the input device such as mouse or keyboard on the local end of the information process device by the user directly, but is done by the light signal transmission process between the light-operated electronic equipment and the mobile electronic device in the invention. Additionally, the aforementioned input data such as system login account and password, system website information, file open account and password, or private dedicated data etc. may all be pre-stored in the mobile electronic device of the invention, or uploaded to cloud simultaneously to avoid loss due to mobile electronic device, and for example "My Favorite" method may be used with list or categorization styles for storage such that the user may choose or control conveniently. As for the user, the input data may be pre-edited to be text messages easily recognizable to the user with the user operation interface provided by the mobile electronic device of the invention, while the mobile electronic device stores real input data correspondingly according to the text message easily recognizable to the user However, the input data is stored in light control code form. Besides, in this example, the information process device 41 performs light signal transmission process with the mobile electronic device of the invention through one transmission equipment (not shown). The transmission equipment is similar to the function of above light-operated electronic equipment in the invention. The only difference is that the transmission does need not memory unit for storing operation code. This is because the execution of the comparison action illustrated by the aforementioned example depends on the program executed currently by the information process device 41. The so called program executed currently by the information process device 41 may be, for example, a webpage program operated by a certain network service system connected and logged in as aforementioned, or the program used to execute specific program system or open specific encryption file on the local end of the information process device 41.

As illustrated in FIG. 8, in step S1, the information process device receives light signal input through the transmission equipment, wherein, the transmission equipment is provided with the light sensing receiving unit and the control unit coupling to the light sensing receiving unit, then, enter step S2. Because the so called light sensing receiving unit and the control unit have the same functions as the light sensing receiving unit 301 and the control unit 302 of the light-operated electronic equipment 30 illustrated in FIG. 1, there will be no duplicate description. In addition, the information process device and the transmission equipment may be connected with the connection method of the transmission interface 42 illustrated in FIG. 7. Alternatively, the information process device may be built in the transmission equipment, that is, there is the light sensing receiving unit exposed to the housing of the information process device, while the control unit may be provided on the main board of the information process device, or the control unit may be arranged with interface card form connected between it and the main board, such that the transmission equipment may be integrated into the information process device. In other words, the connection method between the information process device and the transmission equipment may have different structures according to implementation pattern.

In step S2, the mobile electronic device of the invention output light signal of brightness change through its light source. As stated above, the light signal is output according to the light control code stored in the local end of the mobile electronic device. In other words, a digital signal (light control code) is converted into an analog signal (light signal) for output. Moreover, the light code may represent input data such as system login account an password, system website information, file open account and password, or private dedicated data etc. In other words, there is difference depending on the control to be executed by the user. Subsequently, enter step S3.

In step S3, the light sensing receiving unit of the transmission equipment senses and converts the light signal output from the mobile electronic device into an electronic control code according to the brightness change of the light signal, followed by entering step S4. The so called electronic control code here is data bits capable of being read by the information process device. In other words, the analog signal (light signal) is converted into the digital signal (electronic control code) for the information process device to process.

In step S4, the control unit of the transmission equipment receives and transmits the electronic control code to the information process device through the transmission interface, followed by entering step S5.

In step S5, the information process device performs system login process according to the electronic control code, while the process, as above, determines whether or not the login account and password entered by the user are legal, performs link according to the system website information entered by the user, or performs trading according to the private dedicated data entered by the user etc. In other words, the electronic control code may represent input data such as login account and password, system website information or personal dedicated data.

It is noted that, for the data with security consideration, that is light control code with security data such as card number of credit card or ID number etc., as the light display process module of the mobile electronic device outputs the light signal corresponding to the light control code of the security data, or as the light control code module of the mobile electronic device stores the light control code with the security data, encryption process such as SSL will be performed. Thus, the electronic control code converted by the light sensing receiving unit and received by the information process device is also encrypted with SSL, and is decrypted by the webpage program operated by a certain network service system connected and logged in currently by the information process device 41, or the program executing specific program system or opening specific encrypted file at the local end of the information process device 41.

Therefore, from above, the process method for system login with light control method in the invention may figure out the problem of inconvenience that an user has to enter a series of information. Also, the user may store the aforementioned input data with the mobile electronic device. Therefore, the user does not to make efforts to memorize the series of information mentioned above, and the system administration self-information exists. Besides, the hardware equipment necessary by the process method for system login in light control method may be only the mobile electronic device capable of outputting light signal and the information process device provided with the light sensing receiving unit and the control unit, to improve the unpopularity of hardware specification on NFC (Near Field Communication) or RFID (Radio-frequency identification) that will make users unable to perform payment, or member point deduction process with mobile or credit card effectively or conveniently.

Figure 9:
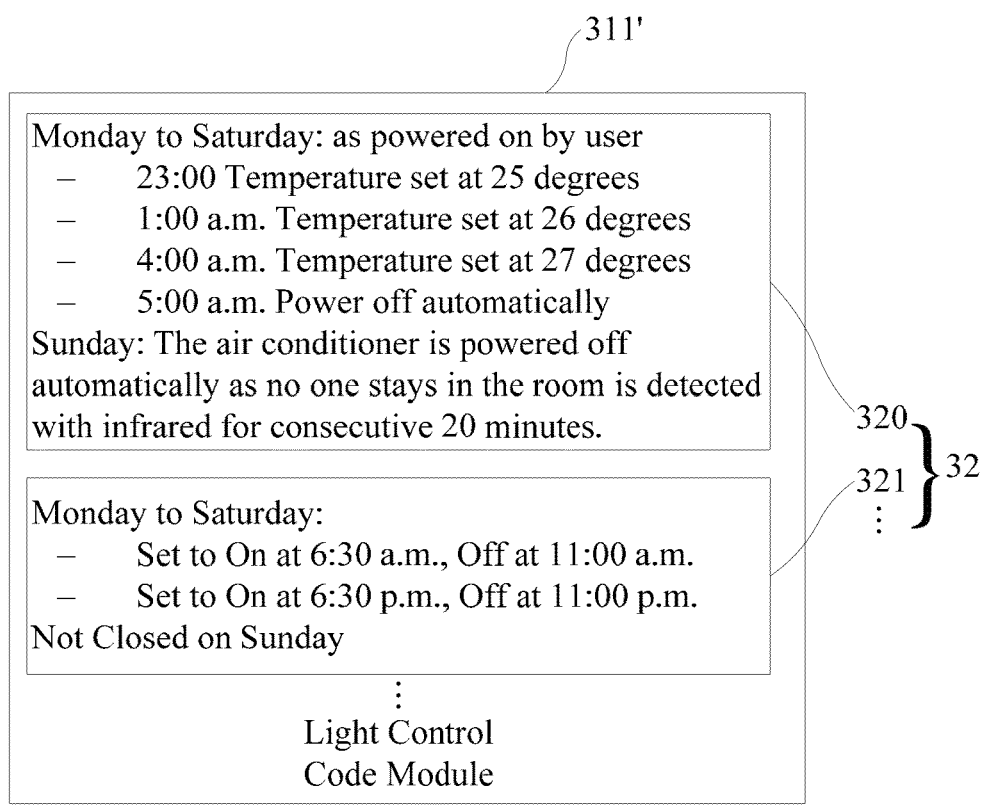
FIG. 9 is a block diagram showing the principle about how the mobile device for controlling an electronic equipment with light controls appliance products of different functions according to the invention.

Subsequently, refer to FIG. 9, which is a block diagram showing control principles for appliance products with different functions by the mobile electronic device of the light-operated electronic equipment according to the invention. As illustrated in FIGS. 1, 2 and 4, for the purpose of controlling appliance products of different functions with light signals by the mobile electronic device of the invention, as shown in FIG. 9, multiple functional setting interfaces 32 are provided in the light control code module 311' of the mobile electronic device. In this example, the functional setting interface 320 is used for an user to set the operation method of an air conditioner, while the functional setting interface 321 is used for the user to set the operation function of an electric hot water bottle. The multiple functional setting interfaces 32 may generate and store light control codes corresponding to the setting results. It is noted that the controlled appliance products such as air conditioner, electric hot water bottle, timer, recorder, video cassette recorder or network camera etc. also must have aforementioned light sensing receiving unit, memory unit and control unit provided in the light-operated electronic equipment of the invention. Further, besides of being used to store the aforementioned instruction (that is, the aforementioned operation code for the control unit to perform operation) for the control unit to determine whether or not the command (that is the aforementioned electronic control code converted by the light sensing receiving unit) transmitted from the mobile electronic device is for the execution of specific operation, the memory unit is further used to store the functional setting values set by the functional setting interfaces 32 transmitted from the mobile electronic device 31 through light signal output method. Moreover, the method the appliance product used to acquire the functional setting value may be the interpretation method for the head, middle and tail segments of the information series transmitted from the mobile electronic device received by the electronic lock. Whereby, as the control unit of the appliance product compares the electronic control code converted by the light sensing receiving unit and the operation code stored in the memory unit to be compliant, the control unit acquires the functional setting value corresponding to the operation code according to the operation code to execute the specific function.

Take FIG. 9 as an example for description, as an user completes setting on an air conditioner functional setting interface 320 provided by the functional setting interface 32 of the mobile electronic device, for example, setting that an air conditioner may only operate in specific time from Monday to Saturday, and the operation content of the air conditioner such as operating temperature etc; after that, the user operates the light source of the mobile electronic device by facing the light sensing receiving unit of the air conditioner to be set and sending a light signal for the air conditioner to perform operation according to the aforementioned functional setting value, and the delivery method of the light signal may be a consecutive series of light, or a successive series of light, that is, depending on the light control form stored in the mobile electronic device. Briefly speaking, the light control code is similar to the information series, while in the air conditioner to be set, the operation code of the memory unit in the air conditioner is a function control code, further, the light sensing receiving unit thereof relies on the brightness change of the light signal delivered by the light source of the mobile electronic device for conversion to corresponding functional setting value, such that as the control unit in the air conditioner compares the electronic control code converted by the light sensing receiving unit thereof and the function control code stored in the memory unit to be compliant, the control unit in the air conditioner may perform operation according to the functional setting value converted by the light sensing receiving unit, that is, perform operation according to the setting content of the functional setting interface 320 illustrated in FIG. 9.

Figure 10:
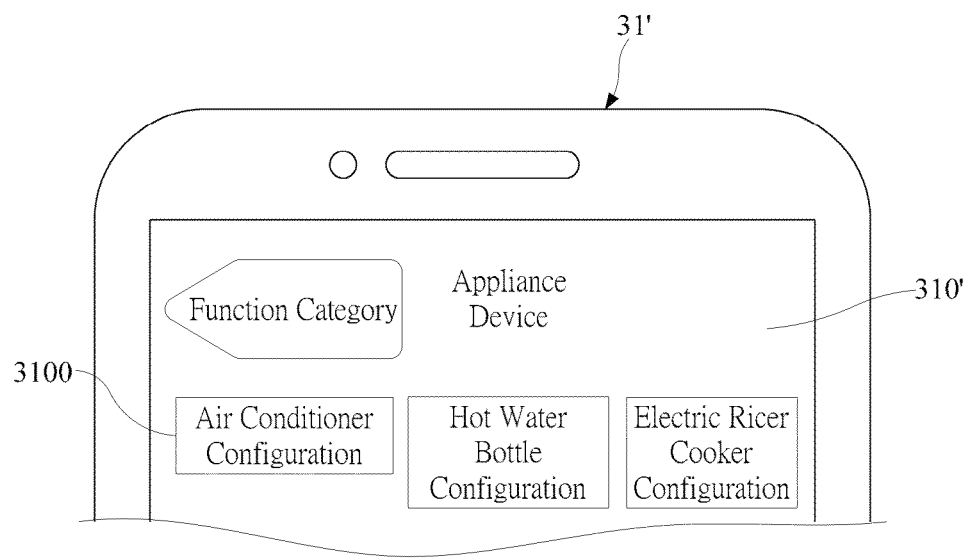
FIG. 10 is an example showing a functional setting interface provided by the mobile electronic device for controlling an electronic equipment with light according to the invention.
Figure 11:
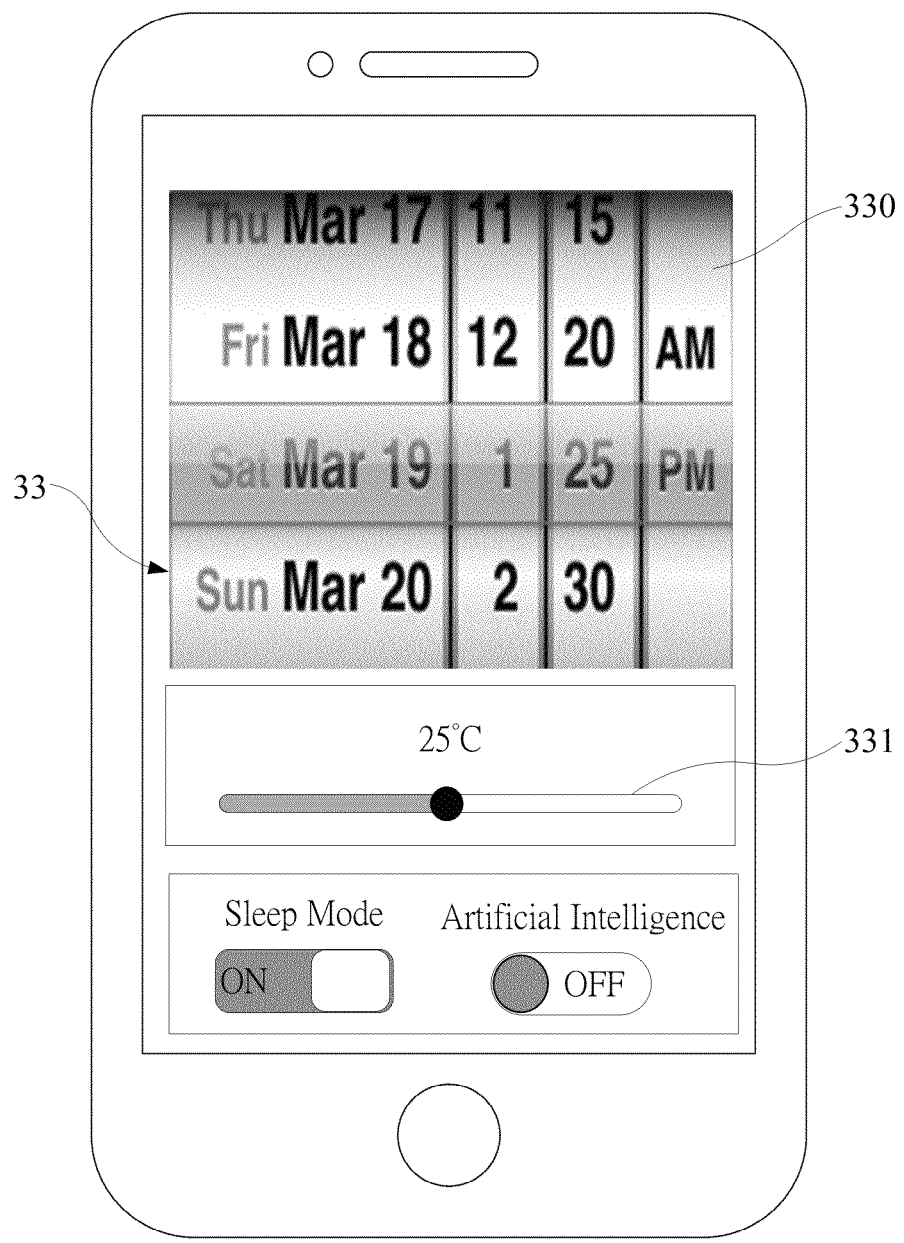
FIG. 11 is an example showing an air conditioner functional setting interface provided by the functional setting interface in FIG. 10.

To clarify the functional setting interface 32 provided by the mobile electronic device of the light-operated electronic equipment through the light control code module 311' according to the invention, refer to FIG. 10. As shown in FIG. 10, it is a functional setting interface displayed by the light source 310' of the mobile electronic device 31' in the light-operated electronic equipment according to the invention. The functional setting interface in this example provides a functional configuration for three appliance products, including air conditioner, hot water bottle and electric rice cooker. After the user clicks the air conditioner configuration functional key 3100, the functional setting interface 32 further provides an air conditioner functional setting interface 33. As shown in FIG. 11, the air conditioner functional setting interface 33 may provide, for example, Date and Time Picker—wheel 330 for the user to set the operation time of the air conditioner, or provide, for example, temperature slider 331 to set operating temperature. Therefore, the user may configure functional setting values of the air conditioner to be controlled conveniently with touch objects provided by the air conditioner functional setting interface 33 of the mobile electronic device. Subsequently, the functional setting value configured by the user is transmitted to the air conditioner to be controlled with light signal by the light source at the mobile electronic device end, and then the air conditioner can operate in accordance with the optical signal.

From above, the functional setting interface of the mobile electronic device in the light-operated electronic equipment according to the invention may replace the hardware component HMI of key, knob and display indicator adopted by controlled appliance products. More specifically, the functional setting of controlled appliance products has been taken over by the functional setting interface of the mobile electronic device in the light-operated electronic equipment of the invention. Thus, the controlled appliance products do not have to be provided with parts assembly of aforementioned key, knob and display indicator, such that parts cost may be reduced effectively. Besides, because the functional setting interface of the mobile electronic device in the light-operated electronic equipment of the invention may be a touch graphical user HMI, in such touch graphical user HMI, besides service of the aforementioned functional setting value, operation manual of the controlled appliance products may also be provided in the touch graphical user HMI. Therefore, the user do not have to look up the operation manual of appliance products as before in appliance product operation setting process, and setting may be performed easier, faster, clearer and more accurate. It is noted that forms or contents of aforementioned functional setting interface are not limited to FIGS. 9 to 11, but depend on implementation pattern.

Besides, when the user performs setting for appliance products by the mobile electronic device of the invention, output devices such as LED or speaker etc. arranged on housing of appliance products may also be utilized to provide feedback to the user in flashing form or audio form, such that the user may recognize "success" or "fail" of functional setting for appliance products.

Moreover, from FIGS. 9 to 11, as for the setting method of the light-operated electronic equipment and the mobile electronic device of the invention for an appliance product, the appliance product does not need to be arranged with multiple input keys or display panel, and the user may still perform multiple function settings. Therefore, the hardware cost of the appliance product is reduced considerably. Further, with the graphical HMI provided by the mobile electronic device, and after configuration through the graphical operation interface, by configuring the functional setting value of the controlled appliance produce in light control method, or issuing operation command thereto, existing complex key control may be prevented.

What is claimed is:

1. A light-operated electronic equipment, which performs operation according to a light signal output from a light source, said light-operated electronic equipment including:
    a light sensing receiving unit, which is used to sense the light signal output from said light source, and converts the light signal into an electronic control code according to brightness change of said light signal;
    a memory unit, which is used to store at least one operation code; and
    a control unit, which is used to couple with said light sensing receiving unit for receiving said electronic control code, and performs operation according to said operation code as said electronic control code coincides with said operation code,
    wherein said light source is arranged in a mobile electronic device, and said memory unit further stores a setting code; as said mobile electronic device outputs another light signal through the light source thereof, said light sensing receiving unit converts said another light signal into another electronic control code according to brightness change of said another light signal; said control unit updates content stored in said memory unit as said control unit distinguishes that said another electronic control code coincides with said setting code.

2. The light-operated electronic equipment as claim 1, wherein said light source provides at least two light output areas, and said light-operated electronic equipment has at least two light sensing receiving units for receiving a first brightness change and a second brightness change output from said at least two light output areas, respectively, such that said light-operated electronic equipment acquires a clock signal represented by said first brightness change according to one of said at least two light sensing receiving units, and said light-operated electronic equipment acquires a level signal represented by said second brightness change according to the other one of said at least two light sensing receiving units, for said light-operated electronic equipment to execute operation according to the first brightness change and the second brightness change output from said at least two light output areas, respectively.

3. The light-operated electronic equipment as claim 1, wherein said light-operated electronic equipment is a data storage device, and said data storage device is connected with an information process device through a transmission interface, the operation code stored by the memory unit in said data storage device is an allowance access operation code, for said control unit to allow said information process device to access memory block provided by said data storage device through said transmission interface as the control unit in said data storage device distinguishes that the electronic control code converted by the light sensing receiving unit thereof coincides with said allowance operation code stored in said memory unit.

4. The light-operated electronic equipment as claim 1, wherein said light-operated electronic equipment is an appliance produce, and the operation code in the memory unit of said appliance product is a function control code, said light sensing receiving unit converts said light signal into a functional setting value according to the brightness change of said light signal, such that said control unit executes operation according to the functional setting value converted by said light sensing receiving unit as the control unit of said appliance product distinguishes that the electronic control code converted by the light sensing receiving unit thereof coincides with said function control code stored in said memory unit.

5. A mobile electronic device for controlling an electronic equipment with light, including at least:
    a light source;
    a light control code module, which is used to store a light control code; and
    a light display process module, which provides a light signal having brightness change output from said light source according to said light control code, to control said electronic equipment with said light signal;
    wherein said light source provides at least two light output areas, and said electronic equipment has at least two light sensing receiving units for receiving a first brightness change and a second brightness change output from said at least two light output areas, respectively, said light control code includes control codes used to control said electronic equipment to execute different operations, said light display process module generates light signals corresponding to said control codes executing the different operations separately, and said light signals are each represented by a clock signal and a level signal with different brightness changes separately, for said electronic equipment to acquire the clock signal of said first brightness change according to one of said at least two light sensing receiving units, and said electronic equipment acquires the level signal of said second brightness change according to the other one of said at least two light sensing receiving units, for said electronic equipment to execute operation according to said first brightness change and said second brightness change.

6. The mobile electronic device for controlling an electronic equipment with light as claim 5, wherein said light control code module and said light display process module are application programs installed in said mobile electronic device.

7. The mobile electronic device for controlling an electronic equipment with light as claim 5, wherein said electronic equipment has a memory unit, said memory unit is used to store a setting code, as said mobile electronic device outputs the light signal corresponding to said control code through the light source thereof, content stored in said memory unit is updated once said electronic equipment distinguishes that said electronic control code coincides with said setting code, wherein said electronic equipment acquires the electronic control code according to the brightness change of said light signal.

8. The mobile electronic device for controlling an electronic equipment with light as claim 5, wherein said electronic equipment is an electronic lock, said electronic lock has a memory unit, said memory unit is used to store an unlocking code, as said mobile electronic device outputs the light signal corresponding to said control code through the light source thereof, a lockset status of said electronic lock is set to be unlocking status once said electronic lock acquires an electronic lock control code according to the brightness change of said light signal and distinguishes that said electronic lock control code coincides with said unlocking code.

9. The mobile electronic device for controlling an electronic equipment with light as claim 5, wherein said electronic equipment is an electronic lock, said electronic lock has a memory unit, said memory unit is used to store a locking code, as said mobile electronic device outputs the light signal corresponding to said control code through the light source thereof, a lockset status of said electronic lock is set to be locking status once said electronic lock acquires an electronic lock control code according to the brightness change of said light signal and distinguishes that said electronic lock control code coincides with said locking code.

10. The mobile electronic device for controlling an electronic equipment with light as claim 5, wherein said mobile electronic device has an application program providing an user operation interface for an user to set control instruction or procedure of the electronic equipment to be controlled; after the user completes the setting, the application program generates and stores the light control code corresponding to the control instruction or procedure set by the user, such that as the user enters the operation instruction or procedure by said user operation interface, the application program extracts the corresponding light control code according to the entered instruction or procedure for the light source to output light signal corresponding to the extracted light control code.

11. The mobile electronic device for controlling an electronic equipment with light as claim 10, wherein the application program of said mobile electronic device further provides a functional setting interface corresponding to appliance products of different functions, and said functional setting interface will generate and store light control codes corresponding to the result set by the user, and each said appliance products has a light sensing receiving unit, a memory unit and a control unit, said memory unit stores operation code for said control unit to use to determine whether or not the light signal transmitted from said mobile electronic device is the operation code executing predetermined operation, further stores functional setting value set by said functional setting interface transmitted from said mobile electronic device through light signal output method, such that the control unit of said appliance products acquires the functional setting value corresponding to said operation code to execute the predetermined function as the control unit distinguishes that the electronic control code converted by the light sensing receiving unit thereof coincides with the operation code stored in said memory unit.

* * * * *